United States Patent
Bonzini et al.

(10) Patent No.: US 10,049,064 B2
(45) Date of Patent: Aug. 14, 2018

(54) TRANSMITTING INTER-PROCESSOR INTERRUPT MESSAGES BY PRIVILEGED VIRTUAL MACHINE FUNCTIONS

(71) Applicant: Red Hat Israel, Ltd., Raanana (IL)

(72) Inventors: Paolo Bonzini, Turate (IT); Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 681 days.

(21) Appl. No.: 14/608,521

(22) Filed: Jan. 29, 2015

(65) Prior Publication Data
US 2016/0224484 A1    Aug. 4, 2016

(51) Int. Cl.
G06F 13/32    (2006.01)
G06F 9/50    (2006.01)
G06F 9/48    (2006.01)

(52) U.S. Cl.
CPC ............ *G06F 13/32* (2013.01); *G06F 9/4812* (2013.01); *G06F 9/5088* (2013.01)

(58) Field of Classification Search
CPC ....... G06F 13/32; G06F 9/4812; G06F 9/5088
See application file for complete search history.

(56) References Cited

U.S. PATENT DOCUMENTS

| | | |
|---|---|---|
| 7,130,951 B1 | 10/2006 | Christie et al. |
| 7,707,341 B1 * | 4/2010 | Klaiber ............... G06F 9/45533 710/244 |
| 8,250,586 B2 | 8/2012 | Nelson |
| 8,266,620 B2 | 9/2012 | Kissell |
| 8,516,479 B2 | 8/2013 | Hattori et al. |
| 8,843,910 B1 | 9/2014 | Schwerin et al. |
| 8,880,764 B2 | 11/2014 | Tsirkin et al. |
| 2002/0174165 A1 * | 11/2002 | Kawaguchi ............. G06F 13/24 718/102 |

(Continued)

FOREIGN PATENT DOCUMENTS

CN    100570587    12/2009

OTHER PUBLICATIONS

"Intel 64 and IA-32 Architectures Software Developer's Manual", Intel Corporation, Chapters 23-29, Sep. 2014, 136 pages http://www.intel.in/content/dam/www/public/us/en/documents/manuals/64-ia-32-architectures-software-developer-vol-3c-part-3-manual.pdf.

(Continued)

*Primary Examiner* — Nimesh G Patel
(74) *Attorney, Agent, or Firm* — Lowenstein Sandler LLP (57) ABSTRACT

Systems and methods for transmitting inter-processor interrupt messages by privileged virtual machine functions. An example method may comprise: mapping, by a hypervisor being executed by a processing device of a host computer system, a plurality of interrupt controller registers of the host computer system into a memory address space of a virtual machine being executed by the host computer system; mapping, into the memory address space of the virtual machine, a task mapping data structure comprising a plurality of records, each record associating a task with a processor of the host computer system; and mapping, into the memory address space of the virtual machine, a notification code module to be invoked by the virtual machine for writing a notification message into an interrupt controller register associated with a processor identified using the task mapping data structure.

17 Claims, 4 Drawing Sheets

(56) References Cited

U.S. PATENT DOCUMENTS

| | | | |
|---|---|---|---|
| 2004/0015969 A1* | 1/2004 | Chang | G06F 12/0831 |
| | | | 718/100 |
| 2006/0195683 A1* | 8/2006 | Kissell | G06F 9/30043 |
| | | | 712/228 |
| 2006/0218328 A1* | 9/2006 | Vega | G06F 13/26 |
| | | | 710/260 |
| 2008/0163239 A1* | 7/2008 | Sugumar | G06F 9/5088 |
| | | | 718/105 |
| 2011/0047310 A1* | 2/2011 | Bonola | G06F 9/4812 |
| | | | 710/268 |
| 2011/0161541 A1* | 6/2011 | Madukkarumukumana | G06F 9/4812 |
| | | | 710/260 |
| 2012/0204183 A1* | 8/2012 | Bayer | G06F 9/5027 |
| | | | 718/102 |
| 2013/0054860 A1 | 2/2013 | Tsirkin | |
| 2015/0277974 A1* | 10/2015 | Beale | G06F 9/4856 |
| | | | 714/19 |

OTHER PUBLICATIONS

Canet, Benoit, "[Qemu-devel] APIC-V and QEMU Block 10 Performance", Mar. 1, 2013, 3 pages https://lists.gnu.org/archive/html/qemu-devel/2013-03/msg00075.html.

Humbel, Lukas, "Multicore Virtualization Over a Multikernel", Master's Thesis Nr. 83, ETH, Zurich, May 5, 2013, 50 pages http://www.barrelfish.org/ma-humbell-final.pdf.

* cited by examiner

TRANSMITTING INTER-PROCESSOR INTERRUPT MESSAGES BY PRIVILEGED VIRTUAL MACHINE FUNCTIONS

TECHNICAL FIELD

The present disclosure is generally related to virtualized computer systems, and is more specifically related to systems and methods for transmitting inter-processor interrupt messages by privileged virtual machine functions.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

A notable design aspect in a virtualized computer system is routing and processing of interrupts. "Interrupt" herein shall refer to an event that requires a processor to execute event-specific instructions, which might involve the processor's holding the current thread of execution and/or switching contexts.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for transmitting inter-processor interrupt messages by privileged virtual machine functions. Efficient interrupt routing may be important in improving interrupt processing latency.

Interrupts and exceptions are events that indicate that a condition exists in the system, the processor, or within the currently executing task that requires attention of a processor. They typically result in a forced transfer of execution flow from the currently running task to a special code fragment (also referred to as an interrupt handler or an exception handler). The action taken by the processor in response to an interrupt or exception is referred to as servicing or handling the interrupt or exception. Interrupts occur at random times during the execution of a program, e.g., in response to signals from physical devices (e.g., requests to service peripheral devices). Software can also generate interrupts by executing the INT n instruction.

Interrupts may be processed by one or more interrupt controllers such as Advanced Programmable Interrupt Controllers (APICs), including one local APIC per processor and one or more input/output (I/O) APICs connected to I/O devices. An interrupt may be addressed to any subset of processors within the system. In a computer system running one or more virtual machines, interrupts may be virtualized by the hypervisor identifying one or more virtual processors for servicing an outstanding interrupt and routing (or injecting) the interrupt message to the identified virtual processors (also referred to as virtual central processing units (vCPU)). Injectable interrupts include external interrupts, non-maskable interrupt (NMI), processor exceptions, software generated interrupts, system management interrupts, initialization interrupts, reset interrupts and software traps.

Each local APIC comprises a set of APIC registers and associated hardware that controls the delivery of interrupts to the processor core and the generation of inter-processor interrupt (IPI) messages. The APIC registers are memory mapped and may be read and written to using an appropriate processor instruction (e.g., MOV).

Certain processor architectures support inter-processor interrupts (IPI) to provide a mechanism to interrupt another processor or group of processors on the system bus. IPIs may be used for software self-interrupts, interrupt forwarding, or preemptive scheduling.

In a computer system running one or more virtual machines, interrupts may be virtualized by the hypervisor identifying one or more virtual processors for servicing an outstanding interrupt and routing (or injecting) the interrupt message to the identified virtual processors. Injectable interrupts include external interrupts, non-maskable interrupt (NMI), processor exceptions, software generated interrupts, system management interrupts, initialization interrupts, reset interrupts and software traps.

Certain processor architectures support virtualization by providing special instructions for facilitating virtual machine execution. In certain implementations, a processor may support executing a virtual machine monitor (VMM) that acts as a host and has full control of the processor and other platform hardware. A VMM presents a virtual machine with an abstraction of one or more virtual processors. A VMM is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the VMM can retain control of platform resources. A transition from the reduced privilege level (also referred to as VMX non-root operation in certain processor architectures) to the VMM context is referred to as a VM exit and may be performed by invoking a special Instruction Set Architecture (ISA)-dependent instruction (e.g., VMCALL).

In certain implementations, in order to send an IPI message to another processor, the origin vCPU should perform a VM exit to transition to a privileged execution mode. The overhead associated with such a transition may adversely affect the overall system efficiency.

Aspects of the present disclosure address the above noted and other deficiencies by providing methods and systems for transmitting inter-processor interrupt messages by privileged virtual machine functions. A VM function is a privileged processor operation that can be invoked by a virtual machine without performing a VM exit. VM functions may be enabled and configured by the settings of certain fields in the Virtual Machine Control Structure (VMCS). A virtual machine may invoke a VM function by using a special ISA-dependent instruction (e.g., VMFUNC). A certain processor register (e.g., EAX) may be employed to select the specific VM function being invoked. Even though the VM function code does not run with elevated privileges, it may be granted access to some privileged resources, e.g., the hypervisor memory or memory of other VMs.

In accordance with one or more aspects of the present disclosure, the hypervisor may initialize an alternative view mapping a plurality of APIC registers and a task mapping data structure into the memory address space of a virtual machine. The task mapping data structure may, in an illustrative example, comprise a plurality of records, such that each record associates a task with a central processing unit (CPU) of the host computer system. The hypervisor may further map, into the memory address space of the virtual machine, a notification code module to be invoked by the virtual machine for writing a notification of an interrupt into the register of the interrupt controller.

The notification code module may be invoked by the guest software for transmitting an IPI message without performing a VM exit. The notification code module may look up the task mapping data structure to identify processor associated with a given task, and may further write an IPI message into an APIC register associated with the identified processor, as described in more details herein below.

In certain implementations, the task mapping data structure may further comprise a validity attribute associated with one or more records (e.g., with one or more tasks). In an illustrative example, the validity attribute may be represented by a migration counter which gets incremented every time when the corresponding task is migrated to another processor. The notification code module may evaluate the validity attribute before writing the IPI message into the identified APIC register: should the validity attribute be evaluated as valid, the notification code may proceed to write the IPI message into the identified APIC register; otherwise, the notification code module may perform a VM exit to transmit the notification from the hypervisor context.

Various aspects of the above referenced methods and systems are described in details herein below by way of examples, rather than by way of limitation.

Figure 1:
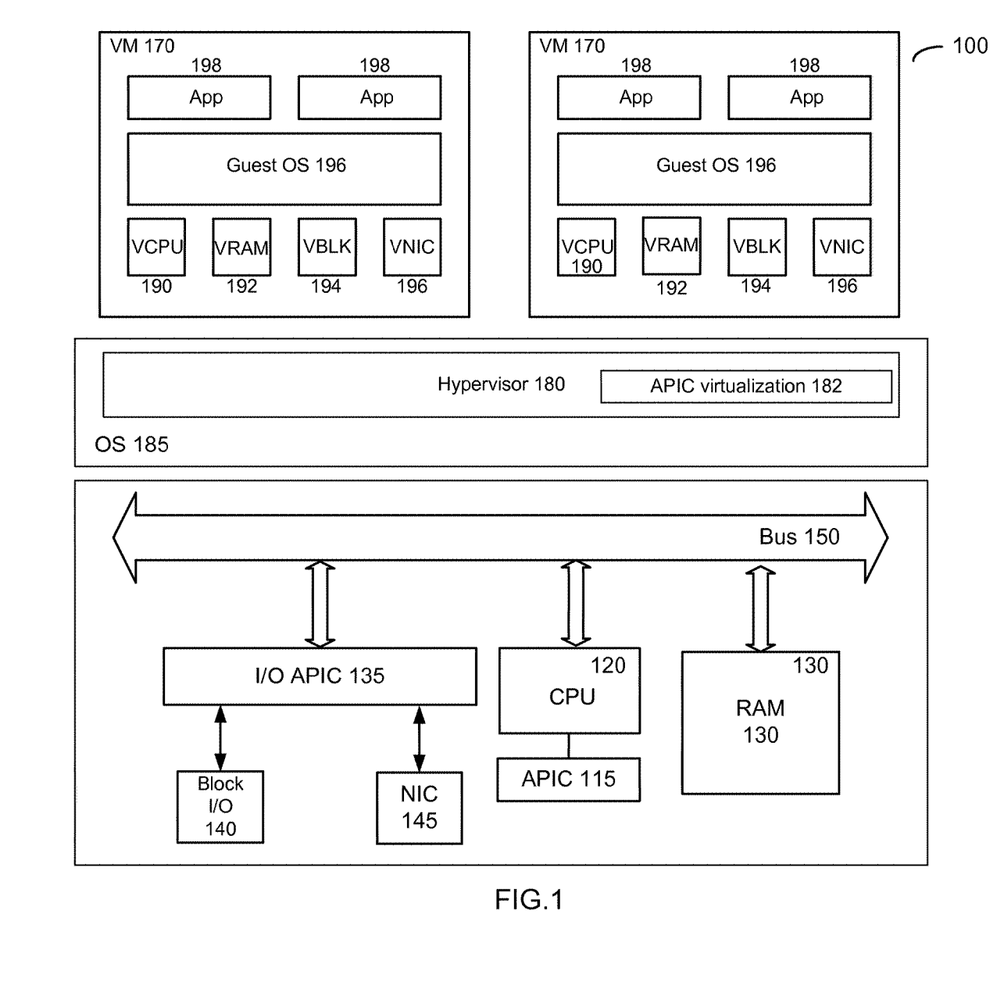
FIG. 1 depicts a high-level component diagram of an example computer system implementing the methods for methods for transmitting inter-processor interrupt messages by privileged virtual machine functions, in accordance with one or more aspects of the present disclosure.

FIG. 1 depicts a high-level component diagram of an illustrative example of a computer system 100 in accordance with one or more aspects of the present disclosure. Computer system 100 may include one or more processors 120 communicatively coupled to memory devices 130 and input/output (I/O) devices 140, 145 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) 145 or a block I/O device, such as disk 140.

Computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., I/O devices connected to an I/O APIC), as well as inter-processor interrupts (IPIs).

Certain processor architectures support inter-processor interrupts (IPI) to provide a mechanism to interrupt another processor or group of processors on the system bus. IPIs may be used for software self-interrupts, interrupt forwarding, Transaction Lookaside Buffer (TLB) shutdown, or preemptive scheduling. In an illustrative example, a processor may generate IPIs by programming the interrupt command register (ICR) in its local APIC. Writing to the ICR causes an IPI message to be generated and issued on the system bus or on the APIC bus. IPIs may be sent to other processors in the system or to the originating processor (self-interrupts). The information written into the ICR includes the type of IPI message to be sent and the destination processor identifier. When the destination processor receives an IPI message, its local APIC processes the message using the information included in the message (such as vector number and trigger mode).

Computer system 100 may run multiple virtual machines 170, by executing a software layer 180, often referred to as "hypervisor," above the hardware and below the virtual machines, as schematically illustrated by FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices. A virtual machine 170 may execute a guest operating system 196 which may utilize the underlying virtual processors 190, virtual memory 192, and virtual I/O devices 194, 196. One or more applications 198 may be running on a virtual machine 170 under the guest operating system 196.

The address space virtualization may be implemented by the paging mechanism designed to support a virtual memory environment where a virtual machine address space is simulated with a smaller amount of random access memory (RAM) and a backing store (e.g., a disk). The memory may be divided into pages of a defined size (e.g., 4 KB) which may be stored on a virtual disk exposed to the virtual machine and accessible via a network. The guest operating system may maintain a page directory and a set of page tables to keep track of the pages. When a virtual machine attempts to access a memory page, it may use the page directory and page tables to translate the virtual address into a physical address. If the page being accessed is not currently in the physical memory, a page-fault exception may be generated, responsive to which the virtual machine may read the page from the virtual disk and continue executing the thread.

Processor 120 may support virtualization by providing special instructions for facilitating virtual machine execution, including one or more instructions facilitating execution of VM functions. A VM function is a privileged processor operation that can be invoked by a virtual machine without performing a VM exit. A virtual machine may invoke a VM function by using a special ISA-dependent instruction (e.g., VMFUNC). In certain processor architectures, a pre-defined processor register (e.g., EAX) may be employed to select a specific VM function being invoked. Even though the VM function code does not run with elevated privileges, it may be granted access to some privileged resources, e.g., the hypervisor memory or memory of other VMs.

In accordance with one or more aspects of the present disclosure, hypervisor 180 may include an APIC virtualization component 182 which may perform the method for transmitting inter-processor interrupt messages by privileged virtual machine functions, as described in details herein below with references to FIG. 2.

In certain implementations, APIC virtualization component 182 may be implemented as a software component invoked by hypervisor 180, and may comprise one or more code modules that implement method 200 described herein below and various auxiliary functions. Alternatively, functions of APIC virtualization component 182 may be performed by hypervisor 180.

In accordance with one or more aspects of the present disclosure, APIC virtualization component 182 may initialize an alternative view mapping a plurality of APIC registers and a task mapping data structure into the memory address space of a virtual machine. The task mapping data structure may, in an illustrative example, comprise a plurality of records, such that each record associates a task with a central processing unit (CPU) of the host computer system. APIC virtualization component 182 may further map, into the memory address space of the virtual machine, a notification code module to be invoked by the virtual machine for writing a notification of an interrupt into the register of the interrupt controller.

The notification code module may be invoked by the guest software for transmitting an IPI message without performing a VM exit. The notification code module may look up the task mapping data structure to identify a processor associated with a given task, and may further write an IPI message into an APIC register associated with the identified processor, as described in more details herein below.

In certain implementations, the task mapping data structure may further comprise a validity attribute associated with one or more records (e.g., with one or more tasks). In an illustrative example, the validity attribute may be represented by a migration counter which gets incremented every time when the corresponding task is migrated to another processor. The notification code module may evaluate the validity attribute before writing the IPI message into the identified APIC register: should the validity attribute be evaluated as valid, the notification code may proceed to write the IPI message into the identified APIC register; otherwise, the notification code module may perform a VM exit to transmit the notification from the hypervisor context.

Figure 2:
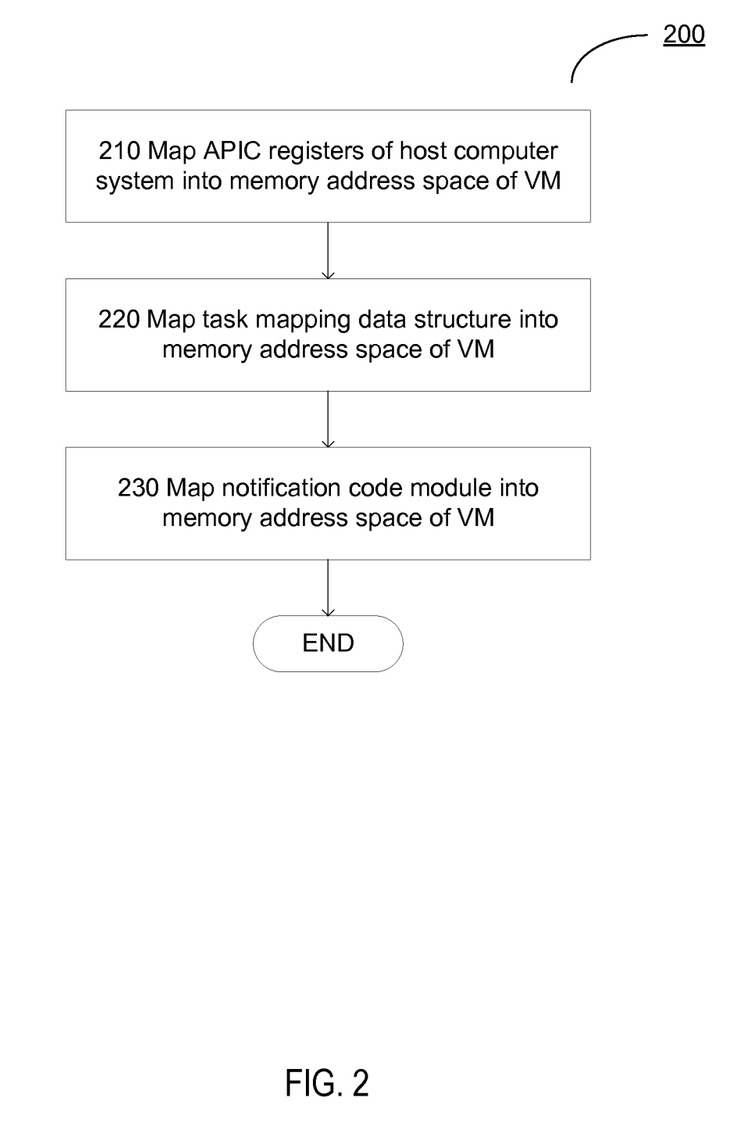
FIG. 2 depicts a flow diagram of a method for transmitting inter-processor interrupt messages by privileged virtual machine functions, in accordance with one or more aspects of the present disclosure.

FIG. 2 depicts a flow diagram of one illustrative example of a method 200 for transmitting inter-processor interrupt messages by privileged virtual machine functions, in accordance with one or more aspects of the present disclosure. Method 200 and/or each of its individual functions, routines, subroutines, or operations may be performed by one or more processing devices of the computer system (e.g., host computer system 100 of FIG. 1) implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, a hypervisor being executed by a processing device of a host computer system implementing the method may map a plurality of interrupt controller registers of the host computer system into the memory address space of a virtual machine being executed by the host computer system. In certain implementations, the interrupt controller may be provided by an Advanced Programmable Interrupt Controller (APIC).

At block 220, the hypervisor may map, into the memory address space of the virtual machine, a data structure comprising a plurality of records, each record associating a task with a central processing unit (CPU) of the host computer system. In certain implementations, the data structure may further comprise one or more validity attributes, each validity attribute associated with one or more records. The validity attribute may be invalidated by the hypervisor responsive to detecting a task migration event. In an illustrative example, the validity attribute may be represented by a counter that is incremented by the hypervisor responsive to detecting a task migration event.

At block 230, the hypervisor may map, into the memory address space of the virtual machine, a notification code module to be invoked by the virtual machine for writing a notification message into an interrupt controller register associated with a processor identified using the data structure. In an illustrative example, the notification message may be represented by an IPI message. The notification code module may evaluate the validity attribute before writing the IPI message into the identified APIC register: should the validity attribute be evaluated as valid, the notification code may proceed to write the IPI message into the identified APIC register; otherwise, the notification code module may perform a VM exit to transmit the notification from the hypervisor context. Upon completing the operations referenced by block 230, the method may terminate.

Figure 3:
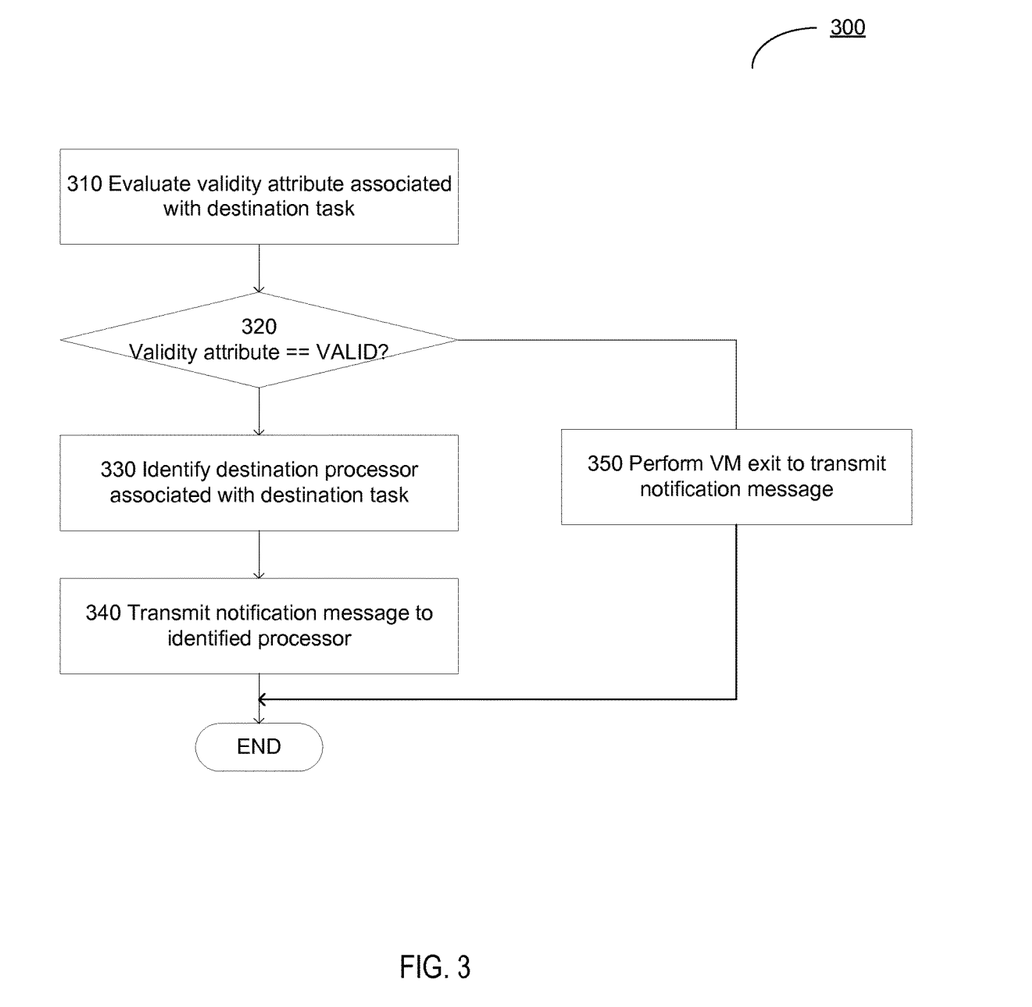
FIG. 3 depicts a flow diagram of one illustrative example of a method 300 implemented by the notification code module that is invoked by a virtual machine in order to transmit a notification message to another processor without performing a VM exit, in accordance with one or more aspects of the present disclosure.

FIG. 3 depicts a flow diagram of one illustrative example of a method 300 implemented by the notification code module that is invoked by a virtual machine in order to transmit a notification message to another processor without performing a VM exit, in accordance with one or more aspects of the present disclosure.

At block 310, the processing device implementing the method may evaluate the validity attribute associated with the destination task. Responsive to ascertaining, at block 320, that the validity attribute is valid, the processing may continue at block 330; otherwise, the method may branch to block 350.

At block 330, the processing device may look up the task mapping data structure to identify processor associated with the destination task.

At block 340, the processing device may transmit a notification message (e.g., an IPI message) to the identified processor, by writing an IPI message into an APIC register associated with the identified processor, and the method may terminate.

Responsive to ascertaining, at block 320, that the validity attribute is invalid, the processing device may, at block 350, perform a VM exit to transmit the notification message, and the method may terminate.

Figure 4:
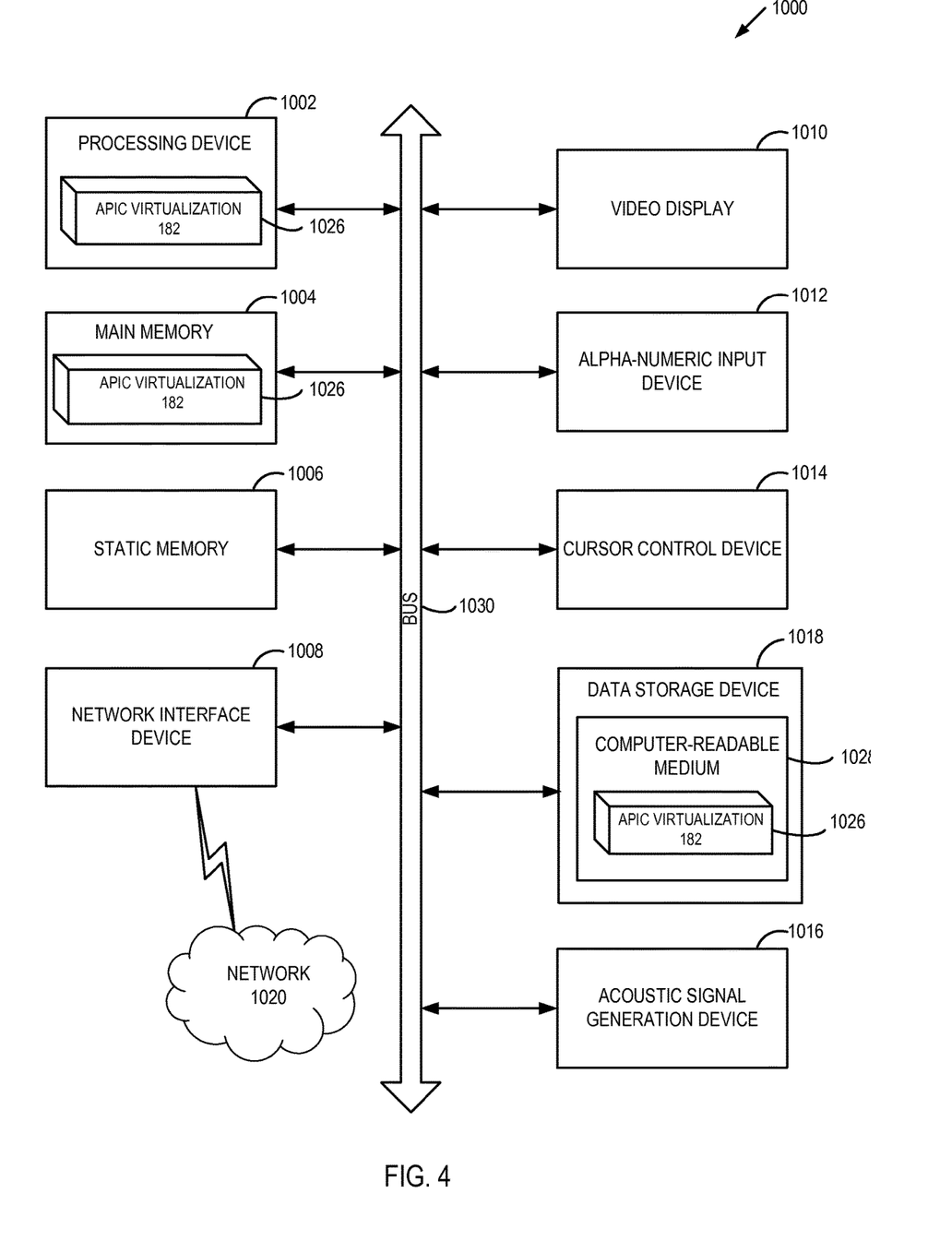
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute APIC virtualization component 182 implementing method 200 for transmitting inter-processor interrupt messages by privileged virtual machine functions.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of APIC virtualization component 182 implementing method 200 for transmitting inter-processor interrupt messages by privileged virtual machine functions.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    mapping, by a hypervisor being executed by a processing device of a host computer system, a plurality of interrupt controller registers of the host computer system into a memory address space of a virtual machine being executed by the host computer system;
    mapping, into the memory address space of the virtual machine, a task mapping data structure comprising a plurality of records, each record associating a task with a processor of the host computer system, wherein each record comprises a validity attribute; and
    mapping, into the memory address space of the virtual machine, a notification code module to be invoked by the virtual machine for evaluating the validity attribute, writing a notification message into an interrupt controller register associated with the processor identified using the task mapping data structure, and performing a virtual machine exit responsive to determining that the validity attribute associated with a task to receive the notification is invalid.

2. The method of claim 1, wherein the interrupt controller is provided by an Advanced Programmable Interrupt Controller (APIC).

3. The method of claim 1, wherein the notification message is provided by an inter-processor interrupt (IPI) message.

4. The method of claim 1, wherein the notification message represents a request from an emulated device.

5. The method of claim 1, further comprising invalidating, by the hypervisor, the validity attribute responsive to detecting a task migration event.

6. The method of claim 1, wherein the validity attribute is provided by a counter that is incremented responsive to a task migration event.

7. A system comprising:
    a memory; and
    a processing device, coupled to the memory, to:
        map a plurality of interrupt controller registers of the host computer system into a memory address space of a virtual machine being executed by the host computer system; map, into the memory address space of the virtual machine, a task mapping data structure comprising a plurality of records, each record associating a task with a processor of the host computer system, wherein each record comprises a validity attribute; and
        map, into the memory address space of the virtual machine, a notification code module to be invoked by the virtual machine for evaluating the validity attribute, writing a notification message into an interrupt controller register associated with a processor identified using the task mapping data structure, and performing a virtual machine exit responsive to determining that the validity attribute associated with a task to receive the notification is invalid.

8. The system of claim 7, wherein the interrupt controller is provided by an Advanced Programmable Interrupt Controller (APIC).

9. The system of claim 7, wherein the notification message is provided by an inter-processor interrupt (IPI) message.

10. The system of claim 7, wherein the notification message represents a request from an emulated device.

11. The system of claim 7, wherein the processing device is further to invalidate the validity attribute responsive to detecting a task migration event.

12. The system of claim 7, wherein the validity attribute is provided by a counter that is incremented responsive to a task migration event.

13. A computer-readable non-transitory storage medium comprising executable instructions that, when executed by a processing device, cause the processing device to:
    map, by a hypervisor being executed by the processing device, a plurality of interrupt controller registers of the host computer system into a memory address space of a virtual machine being executed by the host computer system;

map, into the memory address space of the virtual machine, a task mapping data structure comprising a plurality of records, each record associating a task with a processor of the host computer system, wherein each record comprises a validity attribute; and map, into the memory address space of the virtual machine, a notification code module to be invoked by the virtual machine for evaluating the validity attribute writing a notification message into an interrupt controller register associated with a processor identified using the task mapping data structure, and performing a virtual machine exit responsive to determining that the validity attribute associated with a task to receive the notification is invalid.

14. The computer-readable non-transitory storage medium of claim 13, wherein the notification message is provided by an inter-processor interrupt (IPI) message.

15. The computer-readable non-transitory storage medium of claim 13, further comprising executable instructions to cause the processing device to invalidate the validity attribute responsive to detecting a task migration event.

16. The computer-readable non-transitory storage medium of claim 13, wherein the validity attribute is provided by a counter that is incremented responsive to a task migration event.

17. The computer-readable non-transitory storage medium of claim 13, wherein the notification message represents a request from an emulated device.

* * * * *